United States Patent Office 3,328,054
Patented June 27, 1967

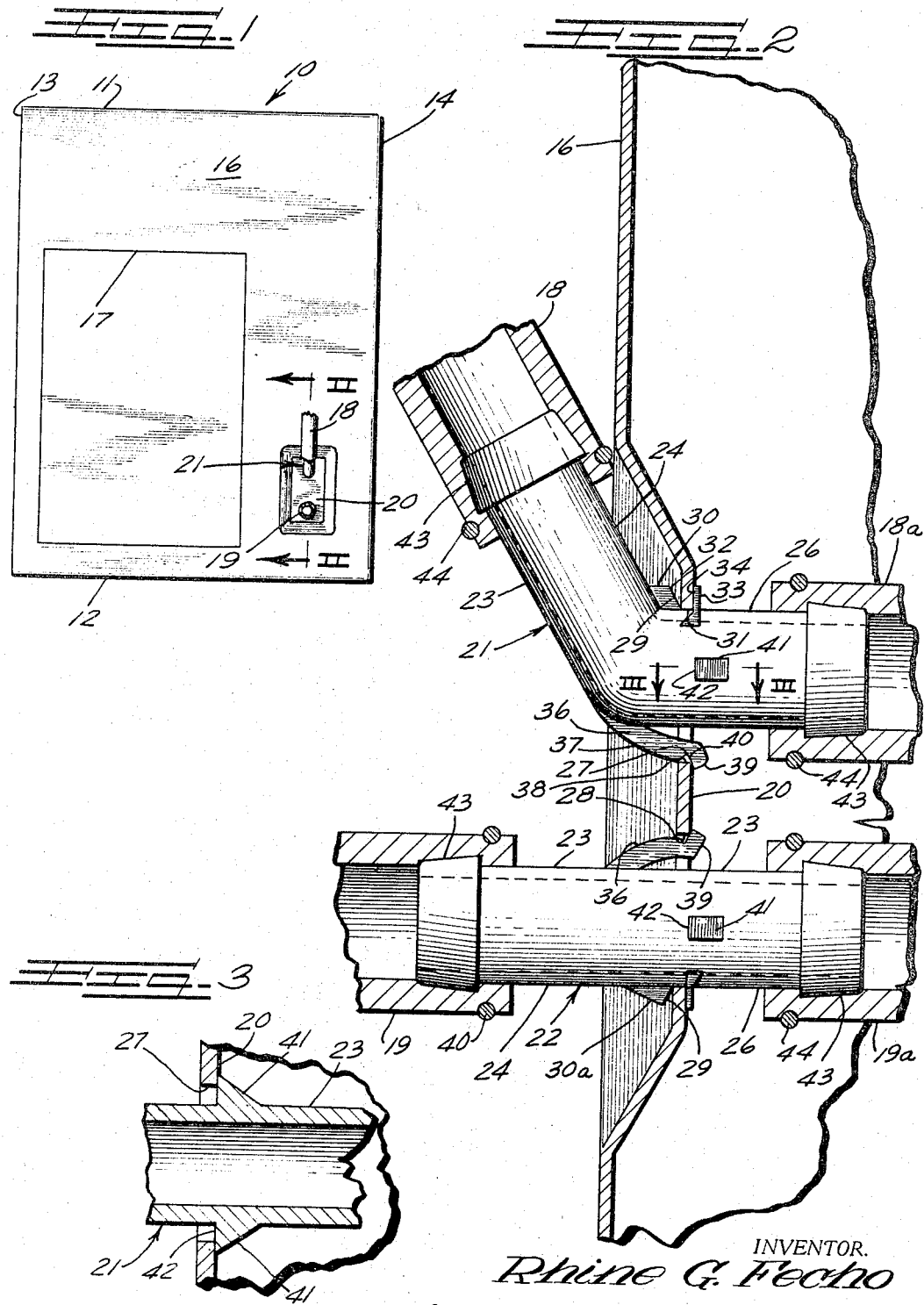

3,328,054
PANEL MOUNTED HOSE CONNECTOR
Rhine G. Fecho, Baroda, Mich., assignor to Whirlpool Corporation, Benton Harbor, Mich., a corporation of Delaware
Filed July 10, 1964, Ser. No. 381,726
2 Claims. (Cl. 285—194)

This invention relates to a hose connector adapted to be mounted on and to extend through a wall panel to provide a coupling for a pair of hoses, for example, laundry liquid hoses situated respectively on opposite sides of a wall panel in a washing machine or other appliance.

In certain apparatus such as domestic appliances fluids must generally be supplied to and delivered from the interior of the apparatus. In the washing machine art, for example, hoses which extend through apertures formed in the wall panels of the machines are employed to supply water into the machine and to circulate or drain laundry liquid.

The present invention contemplates the provision of a hose connector adapted to be securely mounted on a wall panel of the machine and to extend through a hose-receiving aperture formed within the wall panel to provide a coupling for a pair of hoses situated respectively on opposite sides of the panel.

In such manner the hoses themselves need not extend through a wall panel. As a result, rubbing and wear of the hoses on the edges of the panel are eliminated. Also, the interior hoses can be attached to the coupling or connector at the factory and the exterior hoses can be attached to the connector in the field. In addition, the configuration of the connector can be constructed such as to accommodate an angularly inclined relation of the interconnected hoses with respect to one another, thereby obviating the requirement of pre-formed bent hose portions where the interior and exterior portions of the hoses are directed to the aperture through which they extend at different angles with respect to the panel. The connector of this invention is simply designed and easily constructed, is inexpensive in manufacture, is easily assembled on a panel and incorporates mounting means which provide a snug assembly to eliminate vibration of the connector with respect to the panel.

Accordingly, it is an object of the present invention to provide a hose connector for mounting on a panel to interconnect and provide a coupling for separate hose portions situated on either side of the panel.

Another object of the present invention is to provide a hose connector adapted to extend through an aperture formed in the panel and adapted to be counted snugly on the panel.

Another object of the invention is to provide a hose connector with snap-in mounting means for easy mounting of the connector on a panel.

Still another object of the present invention is to provide a hose connector adapted to be mounted on a panel and to extend at an angle from opposite sides of the panel.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

In the drawings:

FIGURE 1 is a rear elevational view of a washing machine constructed in accordance with the principles of the present invention and incorporating a pair of hose connectors of the invention.

FIGURE 2 is a fragmentary vertical sectional view of the back panel of the washing machine of FIGURE 1 taken substantially along lines II—II of FIGURE 1, and FIGURE 3 is a fragmentary section view of a hose connector of the present invention taken substantially along lines III—III of FIGURE 2.

As shown in the drawings:

Although the principles of the present invention are of utility in any application wherein a hose is extended through a panel, a particularly useful application is made to apparatus commonly employed in the laundry art and an illustrative embodiment herein shown consists of a washing machine.

Referring to FIGURE 1, laundry apparatus embodying the principles of the present invention is shown generally at 10 wherein is illustrated a washing machine (incidental portions of which having been removed for clarity) comprising top and bottom walls 11 and 12, side walls 13 and 14 and a back wall 16. The walls of the machine are constructed in the conventional manner from sheet-form members such as panels, and an opening 17 is formed in the back panel 16 to provide ingress into the back portion of the machine.

The machine 10 is also provided with the usual hydraulic circuitry to accommodate an automatic wash cycle, and in furtherance of this purpose is provided with a pair of hoses 18 and 19 which extend from the back panel 16 to supply, for example, water from the usual domestic supply and of suitable temperature into the interior of the machine and to circulate or drain laundry liquid. A recessed portion 20 is formed in that area of the back panel 16 from which hoses 18 and 19 extend.

The hoses 18 and 19 are connected, respectively, to a pair of hose couplings or connectors which are constructed in accordance with the principles of the present invention, such connectors being indicated generally by reference numerals 21 and 22 in FIGURE 2. It will be noted that the connectors actually extend through the recessed portion 20 of the panel 16 and connect interiorly of the panel to a pair of cooperating hose members 18a and 19a.

It will be noted from the drawings that the connectors 21 and 22 are constructed generally similarly and are illustrated as being two exemplary embodiments of the invention and in describing the two embodiments like reference numerals will be used with relation to like parts.

The connectors 21 and 22 are characetrized as comprising a tubular body portion 23 having first and second portions 24 and 26 which are generaly disposed, respectively, on opposite sides of the panel 20. Such first and second portions of connector 21 are angularly inclined with respect to one another, thereby affording particular utility in such instances wherein the hoses 18 and 18a attached thereto must extend from the panel 16 at dissimilar angles with respect thereto. The first and second portions of connector 22 are axially aligned for "straight-through" applications.

In order to provide openings for receiving connectors 21 and 22 through the recessed portion 20, a pair of spaced apertures 27 and 28 are formed therein. The apertures may be advantageously circularly shaped, but in any event it will be appreciated that the respective cross-sections of the apertures are greater in dimension than are the corresponding cross-sections of the connectors in order to accommodate the connectors.

The function of the various parts of connector 21 can best be described with relation to the function which they perform when the connector is being inserted into its aperture and securely fastened to the panel.

In assembly, the connector 21 is first positioned on one side of the panel and the first portion 24 thereof is inserted end-first, into the aperture 27 with the axis of the first portion 24 being positioned substantially perpendicularly to the recessed panel portion 20.

A protrusion defined as a holding member or locating means 29 is formed on the outer surface of the body 23 at the inner portion of the elbow thereof and extends radially outwardly to provide a sliding surface 30, against which a portion 31 of the aperture-defining edge of the panel portion 20 may engage and slide along during further progress of the connector into the aperture.

The holding member 29 also has formed thereon an inclined ramp surface 32, and after the connector 21 has been inserted sufficiently into the aperture 27 such that the edge 31 has traveled past the sliding surface 30, the connector body is pivoted (in a manner similar to that illustrated in the drawings), such that the edge 31 is directed downwardly along the ramp surface 32 into abutting engagement with the connector body 23.

In order to restrict further movement of the connector in a direction lateral to the panel portion 20, and to provide a pivot point about which the body can be pivoted, an abutment wall 33 is formed on the body 23 circumferentially aligned with and axially spaced with relation to the holding member 29 and is more particularly characterized as comprising a radially outwardly extending shoulder surface 34 which forms, in association with the ramp surface 32, a radially extending outwardly diverging groove for receiving the panel edge 31.

In order to lock the connector 21 in place within the aperture, a locking member or arm 36 is formed on the body 23 and extends at an angle outwardly and backwardly toward the second portion 26 of the body 23.

The arm 36 is constructed of resilient material and is dimensioned such that an abutting surface 37 thereof engages a portion 38 of the aperture-defining edge of the panel portion 20 when the body 23 is pivoted about the abutment wall 33. A free or distal end 39 of the arm 26 is elastically resilient and has a locking means 40 formed thereon which may conveniently take the form of a groove as illustrated. The inherent resiliency of the arm 36 is such that when the body 23 has been sufficiently pivoted, portion 38 of the aperture-defining edge of the panel portion 20 will "snap-in" the groove 40 to lock the connector and the panel in firm assembly.

In order to assist the abutment wall 33 in restricting further lateral movement of the connector, and to prevent pivotal movement of the connector about an axis through locking means 40 and abutment wall 33, a pair of circumferentially spaced wing flanges 41, 41 (FIGURE 3) are formed on the connector body 23 and comprise, respectively, a shoulder surface 42 arranged to extend radially outwardly beyond the edge of the aperture 27 to engage the recessed panel portion 20. It will be noted that the wing flanges 41, 41 are circumferentially offset approximately 90° with respect to the abutting wall 33 and the arm member 36 in order to enable the connector to be easily pivoted into its assembled position. With the connector locked in its assembled position, it is restrained against lateral and pivotal movement, but is free to rotate within the circular aperture. This rotational movement permits adjustment of hose direction after installation of the connector without undue bending of the hose.

In order to provide a leak-proof connection between the connector 21 and the hoses 18 and 18a an enlarged head portion 43 is formed at both ends of the connector over which the ends of the hoses are inserted. A hose clamp 44 may be tightened about the end of the respective hoses to ensure a tight connection.

Referring to connector 22, in which the first and second portions 24 and 26 of the connector are axially aligned, the construction thereof is generally otherwise similar to that of connector 21 except that a sliding surface 30a of the holding member 29 is backwardly and outwardly inclined in the assembled position of the connector, as opposed to the disposition of the sliding surface 30 of the connector 21 in its assembled position. Such construction of the sliding surface 30a facilitates insertion of the connector 21 into the aperture 28 in the exemplary embodiment of the "straight-through" construction of the connector 22.

Once locked in place in a panel, the hose connector can be used to couple hoses of a common hydraulic circuit simply by placing the free ends of each respective hose over a corresponding end of the connector.

Although minor modifications might be suggested by those versed in the art, it should be understood that I wish to embody within the scope of the patent warranted hereon all such modifications as reasonably come within the scope of my contribution to the art.

The embodiments of the invention in which an exclusive property or privilege is claimed are defined as follows:

1. A panel mounted hose connector comprising
   an integral one-piece tube having a generally cylindrical wall adapted to pass through an aperture in a panel,
   a connecting means at each respective end of said tube forming a coupling to which a hose-type conduit may be connected,
   and locking means projecting radially outwardly of said wall intermediate its ends comprising,
      a pair of wing flanges at circumferentially spaced points on said wall forming a shoulder having a diametral extent greater than the diameter of the aperture in said panel and overlying the edges of the panel aperture,
   a holding member integral with said tube and having a ramp surface extending outwardly from said wall and offset both circumferentially and axially relative to said shoulder,
   an abutment wall projecting outwardly from said tube wall and spaced from said ramp surface to form therewith an arcuate groove segment spaced circumferentially from said shoulder for receiving a corresponding edge portion of the panel at the aperture,
   and a cantilever arm having a portion integral with said tube wall at a point diametrically opposite said holding member and having a projecting portion extending radially outwardly and longitudinally and terminating in a free end spaced outwardly from said tube wall with a recess formed in said free end for receiving an adjoining edge portion of the panel at the aperture,
      said hose connector being made of a material sufficiently resilient so said arm will elastically and resiliently engage the panel,
   the diametral distance between the base of said groove and the base of said recess being greater than the diameter of said aperture when said arm is in unstressed position, the distance between said tube wall and the adjacent under surface of said arm being sufficient to allow said arm to resiliently deform to provide a snap-in lock assembly when the hose connector is fastened to an apertured panel,
      said groove, said recess and said shoulder forming a circumferential trackway affording relative rotation between the panel and the connector while restraining relative lateral and pivotal movement therebetween,
   so that hose-type conduits of a common hydraulic circuit on opposite sides of said panel can be interconnected by coupling to opposite ends of the connector.

2. A panel mounted hose connector as defined in claim 1 and further characterized by said tube comprising two leg portions angularly inclined with respect to one another, thereby to extend from the panel at dissimilar angles.

References Cited

UNITED STATES PATENTS

| | | | |
|---|---|---|---|
| 486,692 | 11/1892 | Coplin | 285—158 X |
| 1,310,758 | 7/1919 | Levin | 285—194 |
| 2,640,672 | 6/1953 | Bedford | 285—194 X |
| 2,799,518 | 7/1957 | Anderson et al. | 285—194 X |
| 2,880,017 | 3/1959 | Anderson et al. | 285—189 X |

CARL W. TOMLIN, *Primary Examiner.*

D. W. AROLA, *Assistant Examiner.*